Figure 1:
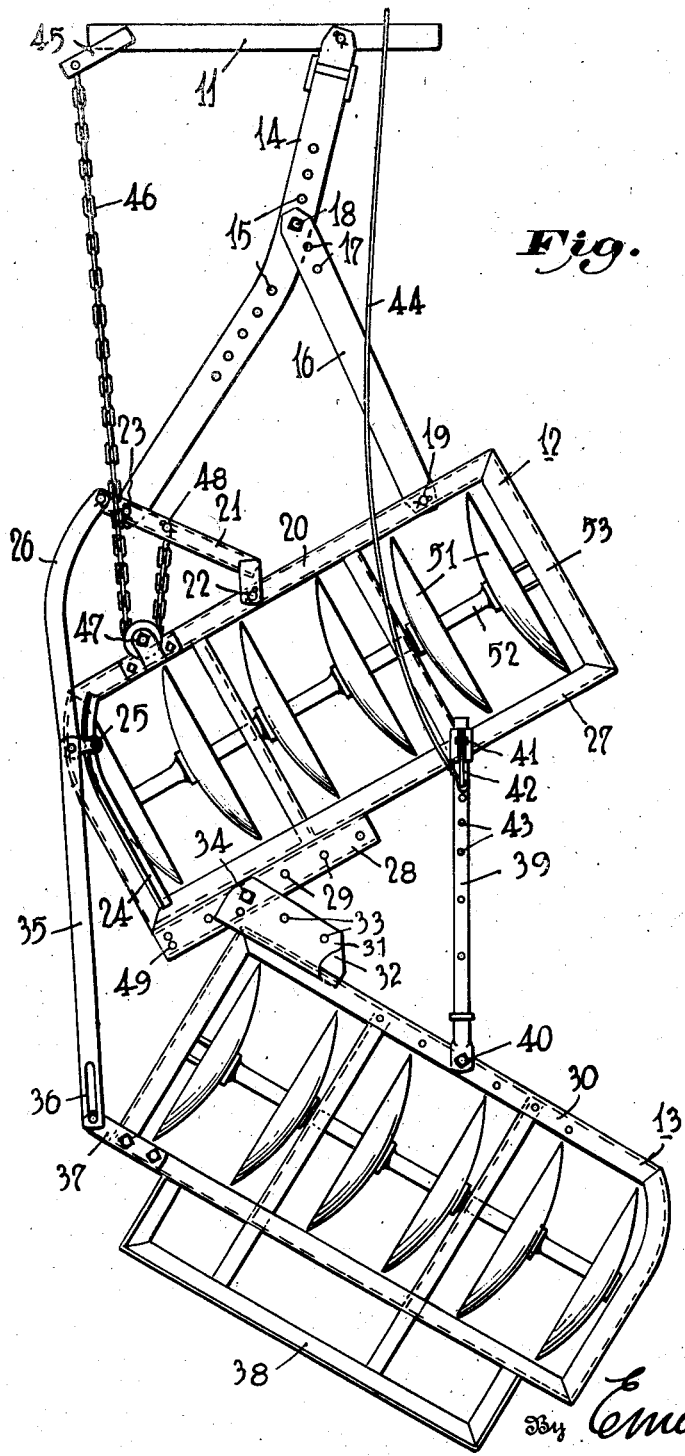

July 16, 1946.　　A. E. RUTTER　　2,404,252
OFFSET DISK HARROW
Filed Jan. 8, 1942　　2 Sheets-Sheet 1

Alvah E. Rutter,
Inventor

By Emerson B. Llowell
Attorney

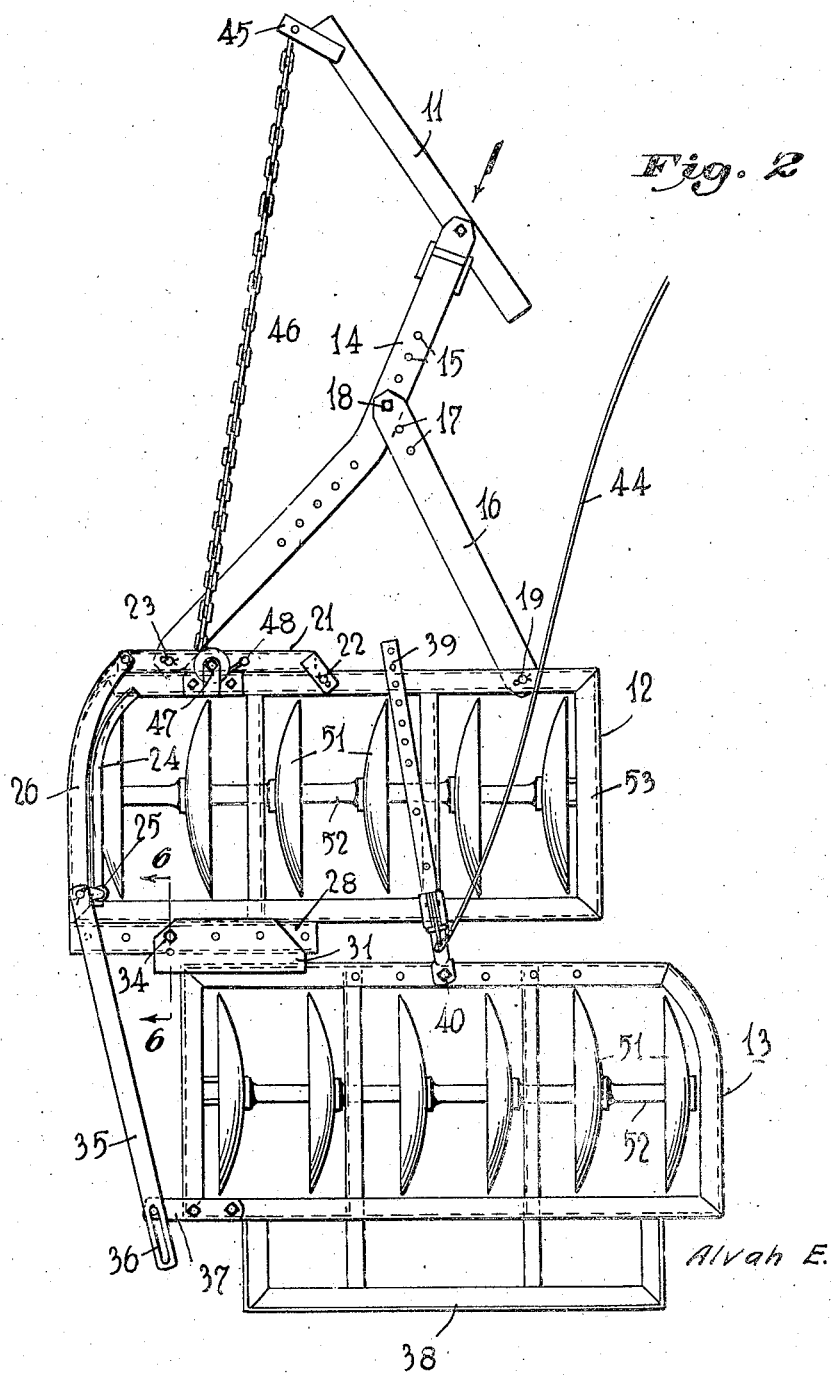

Patented July 16, 1946

2,404,252

UNITED STATES PATENT OFFICE 2,404,252

OFFSET DISK HARROW

Alvah E. Rutter, Rockford, Ill., assignor to J. I. Case Company, Racine, Wis., a corporation Application January 8, 1942, Serial No. 426,081

9 Claims. (Cl. 55—83)

The description which follows relates to my invention in improvements for offset gang disk harrows. Such implements are used for cultivating the ground, principally in orchards or under trees or vines which afford little vertical clearance for working. Consequently, these devices are designed to be drawn as by a tractor and offset from the path of the tractor. When such offset implements are used there is frequent need for adjusting them to make a convenient turn at the end of a row without imposing too great a load on the tractor. They must also be conveniently adjusted into closed, retracted or non-working position so that they may be drawn over sod or a roadway without detrimental cutting of the ground.

It is an object of my invention to provide a disk harrow of the gang type which will follow a tractor but offset at one side without material lateral pull.

It is a further object of my invention to provide such a gang harrow with means so that merely by backing the tractor the sections of the harrow will be caused to close or collapse into a position to trail behind the tractor without harrowing.

It is also an object of my invention to effect such a closing movement of the sections into non-working trailing positions when the tractor makes a turn to the right.

A still further object of my invention is to establish a floating connection between the sections so that a closing movement of the two is effected when the tractor makes a turn to the right.

As illustrating the preferred form of my invention and by way of example only, I have shown it in the accompanying drawings where Fig. 1 is a plan view of my improved offset disk harrow in open or working position;

Fig. 2 is a plan view of the harrow in closed or retracted position.

The drawings show the gang disk harrow arranged to permit making a right hand turn with facilities for collapsing or closing the sections of the harrow either during such a turning movement or when the equipment is transported without harrowing. They also illustrate the control of the rear gang.

I have shown the rear cross-bar 11 of a tractor by which the gang harrow is being operated. The front frame 12 of the harrow is connected to the rear frame 13 in a manner which will be described. Between the front frame 12 and the cross-bar of the tractor is a draw bar 14 pivoted to the cross-bar 11. This draw bar has a series of holes 15 for adjustably holding a link 16. The front end of the link 16 has a series of adjusting holes 17 through one of which passes a vertical pin 18. This pin 18 may thus be adjusted in any one of the holes 15 of the draw bar 14.

The rear end of the link 16 is pivotally connected as at 19 to the front bar 20 of the front frame. Intermediate the rear end of the draw bar 14 and the front frame there is an arm 21. This arm is pivoted at 22 to the front bar 20. The arm 21 and draw bar 14 are pivotally connected at 23.

The left end of the front frame 20 has a track 24 curved at its forward end and carrying a sliding traveller or carrier 25. The traveller 25 is connected by an arcuate link 26 to the end of the arm 21. The arm 21 serves as a lever having its fulcrum at the point 23 and serving to draw the front frame 12 through arm 21 and the rear frame 13 through the arcuate link 26.

Across the rear frame member 27 of the front frame 12 there is an angular metal beam or plate member 28. This has a series of vertically aligned holes 29. The front cross-member 30 of the rear frame 13 at its corresponding left end has an upper plate 31 and a lower plate 32 (see Fig. 6). These plates 31 and 32 have aligned holes 33 through which a pin 34 passes. The plates 31 and 32 straddle the beam 28 so that the pin 34 may be fitted in any one of the holes 29 of the beam 28. This arrangement effectively maintains the rear frame 13 in a plane common with the front frame 12 and withstands the torsional stresses from the trailing ends of the front and rear gangs. It also equalizes the extent to which the disks of each gang may penetrate the dirt.

It will be apparent that the degree of offset of both gangs with respect to the tractor and its draw bar 11 will be determined by the adjustment of the link 16 on the draw bar 14. The front frame 12 will be drawn jointly by the link 16 and the arm 21.

The arm 21 also serves at its free end to assist in drawing the rear frame or gang 13 through the arcuate link 26 and the extension bar 35. This extension bar is pivoted to the traveller 25 in the front and which thus becomes a floating pivot between link 26 and extension bar 35. The latter has a slotted end 36 pivotally connected to a bracket 37 on the rear corner of the frame 13 opposite plate 31. The rear frame 13 has an extension 38 for the usual purpose of added rigidity and carrying additional weights when it is desired to have the disks cut more deeply into the soil.

The angular relation between the frames 12 and 13 is maintained by an adjustable tie-bar 39. This is pivoted at the point 40 on the front side 30 of the rear frame 13. The forward free end of the tie-bar 39 passes through a swiveled collar 41 on the rear member 27 of the front gang frame 12. The swiveled collar 41 carries a pivoted latch pin 42 having a detent, not shown, which may be held by any one of a series of holes 43 in the tie-bar 39. A cord 44 extends from the latch 42 to a convenient point on the tractor thus enabling the operator to release the latch at will.

In the straight forward movement of the gang harrow the front gang 12 is drawn as previously described by the draw bar, the link 16 and the arm 21. This results in a drift of the gang 12 to a point offset and to the right of the tractor's line of travel or path.

By releasing the latch pin 42 the gangs 12 and 13 assume equal and opposite angular positions relative to the line of travel and the latch 42 is then engaged in a hole 43 of the tie-bar 39 holding the two gangs in adjustment. As the disks of one gang are directed oppositely to those of the other gang, the reactions are equal and the line of travel is controlled by the draw bar 14. Adjustment of the latter controls the amount of offset. Adjustment of the tie-bar 39 controls the extent of inclination of the gangs and consequently the depth of cutting the soil.

Means are provided to collapse the gangs 12 and 13 or in other words close them into non-working parallel position. This is effected by backward movement of the tractor and its cross-bar 11. The backward push of the draw-bar 14 spreads the link 16 angularly from the draw-bar and at the same time brings the rock arm 21 against the front member 20 of the gang frame 12. In this operation the gang 12 moves to a position at right angles into the direction of travel. At the same time the operator releases the pin 42 by cord 44 thus permitting the tie-bar 39 to slide forwardly through the swiveled collar 41. As the draw bar 14 is pushed backwardly not only does the swiveled collar 41 slide backwardly over the tie-bar 39 but arcuate arm 26 and extension 35 slide with the traveller 25 backwardly over the track 24. The connection at pin 34 thus becomes the joint of a toggle so that the pin and the corresponding corners of the gangs travel to the left until the front member 30 of the rear gang and the rear 27 of the front gang are brought into parallelism. The adjustment pin 42 in the rear hole 43 then locks the two gangs together for joint travel in a forward direction without harrowing. The open or working position of the gangs permits a turn to the left without undue stress on the parts. However, it has been found in angularly arranged gangs of this type that the harrows will not operate normally on a turn to the right.

I found that I can successfully turn the harrow to the right by first releasing the adjusting pin 42 to permit the collapse or closing movement of the gangs and then supplying added turning effort to the left hand ends of the gangs. After the turning movement has been completed the gangs may then be opened or extended into working positions by the release of the pin 42 as above explained.

To effect the turning of the gangs I have attached a bracket 45 to the left hand end of the cross-bar 11 of the tractor. A chain 46 runs from the free end of the bracket 45 around a pulley or sheave 47 on the front frame member 20 of the gang 12 and thence to the right to an intermediate point 48 on the pivoted arm 21.

During forward travel of the harrow, chain 46 is slack. When the tractor makes a turn to the right, however, the chain 46 tightens and draws the left hand end of the frame member 20 up against the arm 21 in the position shown in Fig. 2. At the same time the link 16 pushes backwardly against gang 12 and telescopes the tie-bar 39. In this way the harrow in non-working position is readily trailed behind the tractor in a right hand turn.

As soon as the tractor resumes forward travel chain 46 slackens and the front gang takes up the normal angular position determined by the relation between the draw bar 14 and the link 16. At the same time the latch pin 42 is released and the rear gang extended to the desired limit for operation.

The above description relates to the preferred form of my invention wherein a disk harrow having two or more gangs may be trailed behind a tractor offset from the path of the latter. Provision has also been made for enabling the harrow to be adjusted for making right hand turns readily and for collapsing into closed or non-working position incidental to such a turn or for transport. While I have illustrated the preferred form of my invention it will be understood as not limited to this form but capable of embodiment otherwise with appropriate changes in size, proportion or equivalent parts.

What I claim is:

1. In combination with a tractor, a harrow comprising a frame, a transverse shaft journalled in the frame, a series of disks on the shaft, a draw-bar connected to the tractor, a link pivoted to the draw-bar and frame, an arm pivoted to the frame and to the draw-bar, a sheave on the front of the frame opposite the pivoted arm, and a chain around the sheave with its opposite end portions extending forwardly and attached to the pivoted arm and to the tractor at a point spaced laterally from the point of attachment of the drawbar to the tractor.

2. In combination with a tractor having a bracket at one side thereof, a harrow comprising a frame, a transverse shaft journalled in the frame, a series of disks on the shaft, an arm pivoted substantially at the mid-point of the frame and extending toward the end nearer the bracket on the tractor, a draw-bar pivoted to the free end of the arm and to the tractor inwardly of the bracket, a link pivoted to the draw-bar and to the frame on the side of the arm remote from the bracket, a sheave on the frame back of the arm and a flexible element, passing around the sheave and having end portions extending forwardly and attached to the bracket and to said arm, so as to exert a forward pressure on said frame and a simultaneous rearward pressure on said arm upon turning of the tractor.

3. In combination with a tractor having a bracket at one side thereof, a gang harrow comprising front and rear frames pivotally connected together, means releasably holding the sections in spaced angular relationship, an arm pivoted substantially at the mid-point of the front frame and extending toward the end nearer the bracket on the tractor, a draw-bar pivoted to the free end of the arm and to the tractor inwardly of the bracket, a link pivoted to the draw-bar and frame on the side of the arm remote from the bracket, a floating pivot on the end of the front frame back of the arm, links connecting the said pivot to the arm and to the rear of the rear frame and means operable from the bracket on the turning movement of the tractor for bringing the frames together, with their axes substantially parallel.

4. A gang harrow comprising front and rear frames, pivotally connected together, means releasably holding the frames in spaced angular relationship, an arm pivoted substantially at the mid-point of the front frame and extending toward one end, a draw-bar pivoted to the free end of the arm, a link pivoted to the draw-bar and to the frame, on the side opposite the arm, a track on the end of the front frame back of the arm, a carrier on the track, a link between the carrier and the free end of the arm, a bracket on the rear of the rear frame, a link connecting the bracket with the carrier and means for moving the carrier rearwardly over the track for bringing the frames substantially into parallelism.

5. A gang harrow comprising front and rear frames pivotally connected together at adjacent corners, means for drawing the front frame forward at an inclination to the line of travel, means for releasably holding the frames in spaced angular relationship, a link pivoted to the corner of the rear frame back of the pivoted connection between the frames, and extending to a point on the side of the front frame in advance of the pivoted connection between the frames, a carrier on the side of the front frame for the link, and means for bringing the frames together with their pivotal connection substantially in line with the carrier.

6. In combination with a tractor, having draft means, a gang harrow comprising front and rear frames pivotally connected together, means for drawing said front frame, from a point on said draft means, forwardly at an inclination to the line of travel, said pivotal connection being adapted for holding said frames together in a common substantially horizontal plane, an arm pivoted to the front frame and connected to the means for drawing the front frame, releasable means for holding the frames, at will, in spaced angular relation, and means connecting from a point on said tractor spaced laterally from the point on said draft means from which said front frame is drawn, and connected with said arm and said front frame for forcing said arm and frame toward each other as a result of turning of said tractor in one direction.

7. In combination with a tractor, having draft means, a gang harrow comprising front and rear frames pivotally connected together, means for drawing said front frame, from a point on said draft means, forwardly at an inclination to the line of travel, an arm pivoted to the front frame and connected to the means for drawing the front frame, releasable means for holding the frames, at will, in spaced angular relation, and means connecting from a point on said tractor spaced laterally from the point on said draft means from which said front frame is drawn, and connected with said arm and said front frame, for forcing said arm and frame toward each other as a result of turning of said tractor in one direction.

8. A gang harrow for cooperation with a tractor, said harrow comprising a front frame and a rear frame connected together, each including a shaft carrying a gang of disks, a draw bar connected to the tractor, a link pivoted to the draw bar and to the front frame, an arm pivoted to the front frame and extending in a direction transverse to the line of travel, a connection from said arm to a portion of said rear frame, said arm also being pivoted to said draw bar, and flexible means connected to the tractor and spaced laterally from the point of connection of said draw bar therewith, a sheave journaled on the front frame said means being extended to said sheave and about said sheave to said arm, so as to force said front frame forwardly and said arm and said portion of said rear frame backwardly, upon turning movement of the tractor in one direction, and releasable means for holding the frames at will in spaced angular relation.

9. A gang harrow for cooperation with a tractor, said harrow comprising a front frame and a rear frame connected together, each including a shaft carrying a gang of disks, a draw bar connected to the tractor, a link pivoted to the draw bar and to the front frame, an arm pivoted to the front frame and extending in a direction transverse to the line of travel, a connection from said arm to a portion of said rear frame, said arm also being pivoted to said draw bar, and flexible means connected to the tractor and spaced laterally from the point of connection of said draw bar therewith, a sheave journaled on the front frame, said means extending rearwardly to said sheave, about said sheave and then forwardly to and being connected with said arm, so as to force said front frame forwardly and said arm and said portion of said rear frame backwardly, upon turning movement of the tractor in one direction.

ALVAH E. RUTTER.